United States Patent [19]
Nimberger

[11] Patent Number: 5,832,956
[45] Date of Patent: Nov. 10, 1998

[54] THREE VALVE CONTROLLED VENT MANIFOLD

[75] Inventor: Spencer M. Nimberger, Houston, Tex.

[73] Assignee: PGI International Ltd., Houston, Tex.

[21] Appl. No.: 697,196

[22] Filed: Aug. 21, 1996

Related U.S. Application Data

[60] Provisional application No. 60/004,282, Sep. 25, 1995.

[51] Int. Cl.[6] ...................................................... F17D 1/00
[52] U.S. Cl. .......................................... 137/597; 137/884
[58] Field of Search ................................... 137/884, 594, 137/597

[56] References Cited

U.S. PATENT DOCUMENTS 5,277,224  1/1994  Hutton et al. ............................ 137/597

OTHER PUBLICATIONS

Agco Manifolds Anderson, Greenwood & Co. Catalog 3000, Oct. 1980.

*Primary Examiner*—Denise L. Ferensic
*Assistant Examiner*—Ramyar M. Farid
*Attorney, Agent, or Firm*—Jenkens & Gilchrist P.C.

[57] ABSTRACT

A three valve manifold having body, flange and web sections has primary flow blocking and crossover valves operatively disposed in the body. Vent ports are disposed in a rear surface of the body, and vent port control valves that controllably direct and selectively block fluid flow from primary flow passages disposed within the manifold, to the vent ports. The vent port control valves are operatively disposed in the web of the manifold. Positioning the vent port control valves in the web of the manifold enables the thickness of the flange to be reduced to that required to only provide an mounting surface and fluid transfer ports.

1 Claim, 2 Drawing Sheets

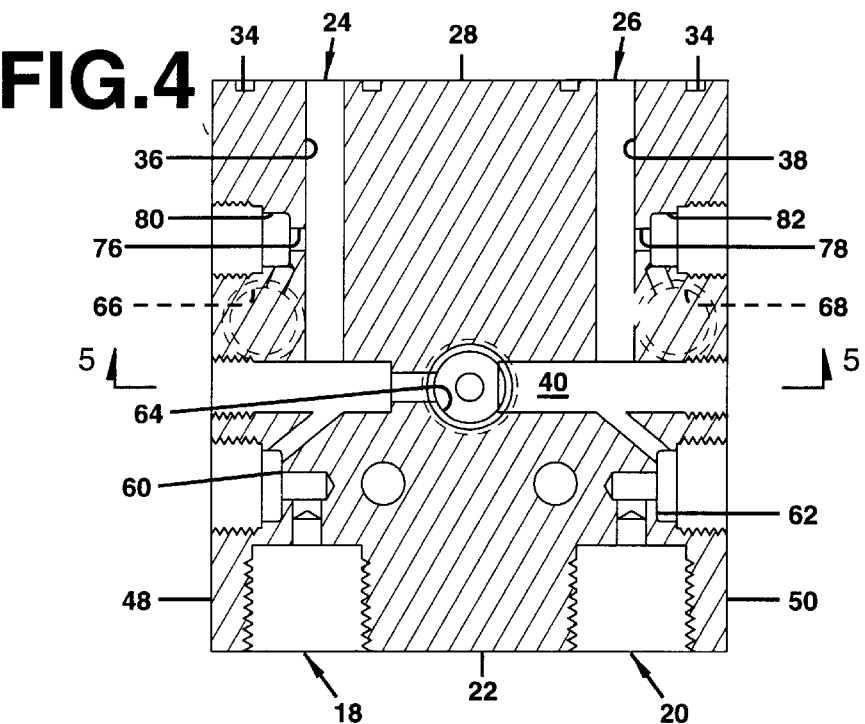
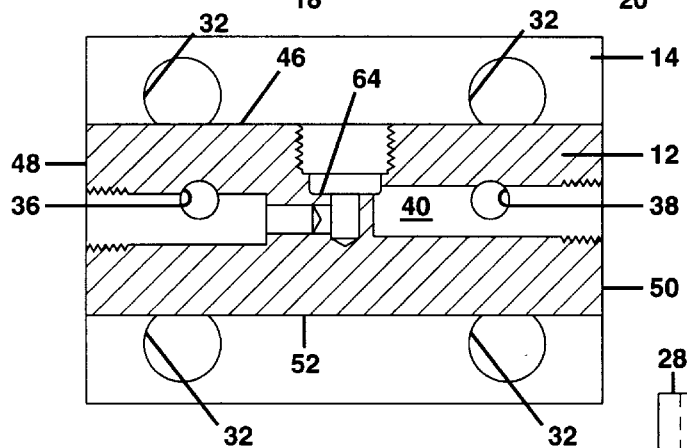
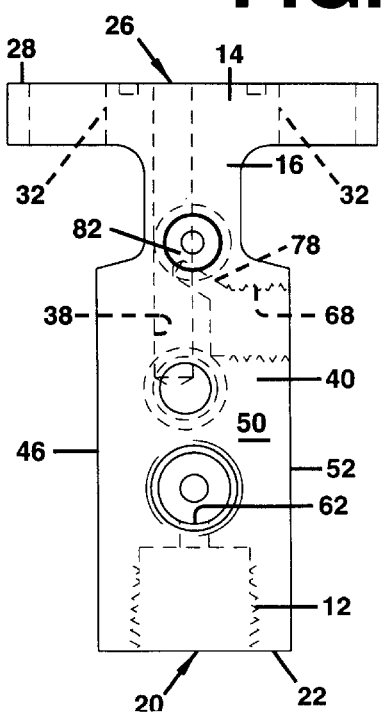
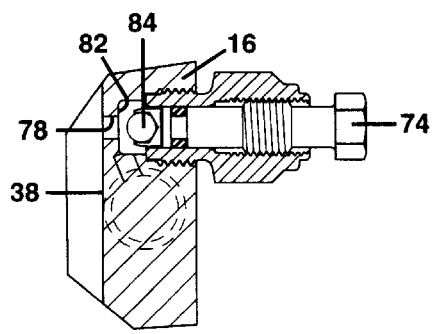

5,832,956

THREE VALVE CONTROLLED VENT MANIFOLD

This application claims priority of provisional patent application Ser. No. 60/004,282, filed Sep. 25, 1995.

BACKGROUND OF THE INVENTION

1. Field of the Invention

This invention relates generally to multiple-valve manifolds, and more particularly to a manifold having a web disposed between body and flange elements of the manifold.

2. Description of the Related Art

Multiple valve manifolds are widely used in the chemical processing, petroleum refining and other fluid process industries to control the flow of fluid from two pressure sources, such as from both sides of an orifice to a pressure transmitter for use in measuring fluid flow rates through the orifice. In particular, three valve manifolds of the type having integrally formed body, flange and web sections, typically have a pair of isolation valves that respectively control the flow of fluid through two primary flow passageways through the manifold, and a crossover valve for controlling the flow of fluid between the two primary flow passageways. The isolation and crossover valves are operatively disposed in the body of the manifold. Such three valve manifolds having the body-web-flange configuration also typically have a pair of vent ports to which the flow of fluid from each of the primary flow passageways is controlled by a closure element disposed in the vent port itself, or by a vent port control valve disposed in the flange of the manifold.

Heretofore, in order to provide sufficient thickness in the manifold flange to accommodate the vent port control valves, it has been necessary to construct the flange with a greater thickness than would otherwise be required. The function of the manifold flange is simply to provide a means for mounting and providing aligned fluid transfer ports with another element, such as a measurement instrument. For those purposes, the flange of the manifold could be relatively thin. Thus, it can be seen that, but for the thickness required for housing the vent port control valves, the flange thickness could be reduced, resulting in a corresponding decrease in the amount of material required to form the manifold. The amount of material required to form the blank extrusion or casting from which the manifold is machined is particularly significant when the manifold is formed of stainless steel or other relatively high-cost alloy.

The present invention is directed to overcoming the problem of excessive flange thickness in three valve manifolds having controlled vent ports. It is desirable to have a three valve manifold with controlled vent ports without unnecessarily increasing the thickness and mass of the flange section of the manifold. It is also desirable to have such a manifold valve in which the amount of material required to form the manifold blank is substantially reduced without compromising any of the operational functions of the valve.

SUMMARY OF THE INVENTION

In accordance with one aspect of the present invention, a manifold has first and second inlet ports and first and second outlet ports with first and second primary flow passageways extending respectively between each of the first inlet and outlet ports and second inlet and outlet ports, and a crossover passageway providing fluid communication between the first and second primary flow passageways. The manifold has a structure defined by body, flange and web sections. The body has a means disposed within for controllably directing and selectively blocking fluid flow through and between the first and second primary flow passageways, and further has first and second vent ports formed in a rear surface of the body that are in controllable fluid communication with a respective one of the first and second primary flow passageways. The flange is spaced from the body and has a mounting surface in which the first and second outlet ports are formed. The web extends between the body and the flange and has a means operatively disposed within for controllably directing and selectively blocking fluid flow between the first and second primary flow passageways and a respective one of the first and second vent ports.

Other features of the manifold embodying the present invention include the means disposed in the web for controllably directing and selectively blocking fluid flow between the respective primary flow passageways and the vent ports being defined by first and second vent port control valves. The vent port control valves are mounted on separate side surfaces of the web and each are operatively disposed within the web at a position at which they are separately capable of selectively directing and controllably blocking fluid flow between a respective one of the first and second primary flow passageways and a corresponding first or second vent port.

BRIEF DESCRIPTION OF THE DRAWINGS

FIG. 4 is a vertical cross-sectional view of the manifold embodying the present invention, taken along the line 4—4 of FIG. 3, with the flow control valves removed to more clearly show the internal passageways formed within the manifold;

FIG. 5 is a horizontal cross-sectional view of the manifold embodying the present invention, taken along the line 5—5 of FIG. 4;

FIG. 6 is right side view of the manifold embodying the present invention with flow control and vent port control valves removed to better show details of the internal passageways in the manifold; and FIG. 7 is an enlarged view of the upper right portion of the cross-sectional view shown in FIG. 4, with the vent control valve added and the stem and closure element of the vent control valve shown in elevation.

DESCRIPTION OF THE PREFERRED EMBODIMENT

Figure 1:
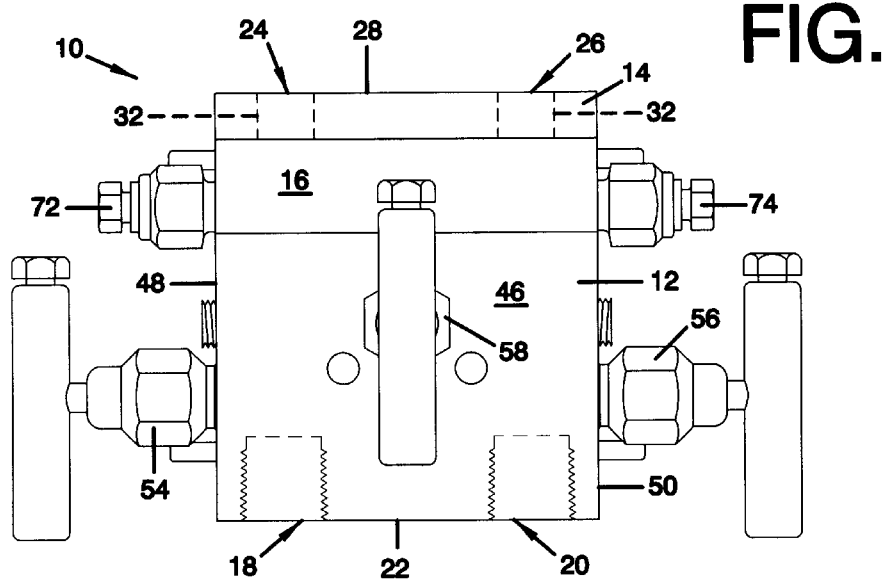
FIG. 1 is a front elevational view of the manifold embodying the present invention.
Figure 2:
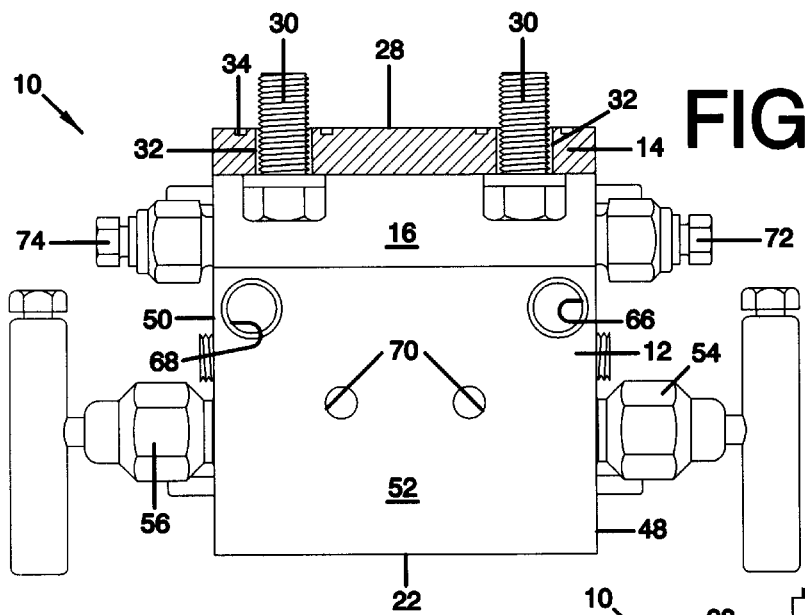
FIG. 2 is a rear view of the manifold embodying the present invention, with the flange shown in cross section.

The present invention is directed to a three valve manifold, represented by the reference number 10 in the drawings, that has separately defined but integrally formed body 12, flange 14, and web 16 sections. Importantly, the inventor of the present invention has discovered that by incorporating the vent port control valves and certain vent passages in the web section 16 of the manifold 10, the thickness of the flange 14 can be significantly reduced, resulting in less manifold mass and, accordingly, less material requirements and lower manufacturing cost. For example, previous manifolds of the size and type embodying the present invention in which vent port control valves were disposed in the flange of the manifold, required additional length to provide clearance between the vent ports and the mounting bolts, and a flange thickness of at least about 0.675 in (1.71 cm). In marked contrast, the manifold embodying the present invention, in which the vent port control valves are operatively disposed in the web section 16 of the manifold, enables to the flange thickness to be reduced to about 0.406 in (1.03 cm), a reduction of about 40 percent. Thus it can be readily understood that this significant reduction in the requisite flange thickness alone, provides important material savings and attendant economic benefits.

The three valve manifold 10 embodying the present invention has first and second inlet ports 18,20 formed in a bottom surface 22 of the body 12, and corresponding first and second outlet ports 24,26 formed in a mounting surface 28 of the flange 14. In the illustrated configuration, the inlet ports 18,20 have internal threads that are sized to receive a standard ½ in (1.27 cm) NPT threaded pipe or tubing adapter. Each of the outlet ports 24,26 have a nominal ¼ in (0.635 cm) diameter opening and are spaced apart by a distance at which they are aligned with the inlet ports of a measuring instrument such as a pressure transducer, or other mechanical element, not shown. The measuring instrument or other element is removably secured to the mounting surface 28 of the flange 14 by a plurality of bolts 30 that extend through bolt holes 32 formed in the flange 14. Desirably, an O-ring seal, not shown, is positioned in a groove 34 formed in the mounting surface 28 in circumscribing relationship with each of the outlet ports 24,26.

Figure 3:
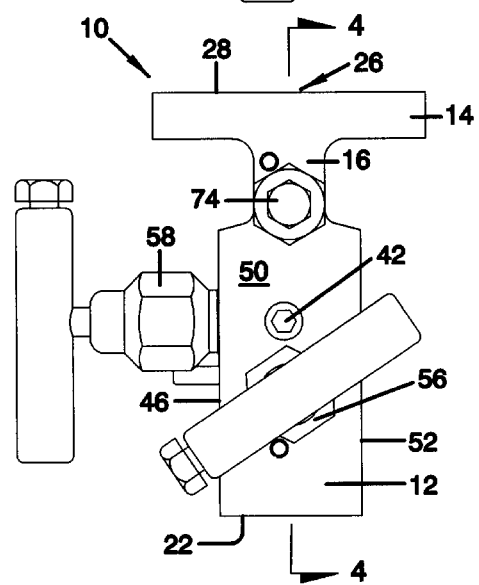
FIG. 3 is a right side view of the manifold embodying the present invention.

As best shown in FIG. 4, a first primary flow passageway 36 is internally disposed within the manifold 10 and provides fluid communication between the first inlet port 18 and the first outlet port 24. In similar fashion, a second internally disposed primary flow passageway 38 provides fluid communication between the second inlet port 20 and the second outlet port 26. A crossover passageway 40 extends between the first and second primary flow passageways 36,38 and provides fluid communication between the two primary flow passageways. In the illustrated configuration of the manifold 10 embodying the present invention, the crossover passageway 40 is conveniently formed by drilling holes from each side of the body 12. The drilled opening is then threaded and sealed with a conventional pipe plug 42 as shown in FIG. 3.

The body 12 has a front surface 46, a left side surface 48, as viewed from the front view of FIG. 1, an oppositely disposed right side surface 50, a rear surface 52, and the previously referenced bottom surface 22. Means are disposed within the body 12 for controllably directing and selectively blocking fluid flow through and between the first and second primary flow passageways 36,38, and include first and second blocking, or isolation, valves respectively identified in the drawings by reference numbers 54 and 56, and a crossover valve 58. More specifically, the first and second blocking valves 54,56 are mounted in threaded seat pockets 60,62 that, as best shown in FIG. 4, are respectively formed in the left and right side surfaces 48,50 of the body 12. The crossover valve 58 is mounted in a threaded seat pocket 64 formed in the front surface 46 of the body 12.

The primary flow passageways 36,38 each comprise a vertical passage extending upwardly from their respective inlet ports 18,20 to a short, narrowed, horizontal inward extension of each of the blocking valve seat pockets 60,62. The seat pockets are respectively sealed by a conventional closure element such as a ball, not shown, that seats against the opening of the short horizontal extension at the bottom of the respective pocket. Another portion of each of the primary flow passageways 36,38 is provided by a short angled passage extends upwardly from each of the seat pockets 60,62 to a respective side of the crossover passageway 40. Lastly, the uppermost portion of each of the primary flow passageways comprise relatively longer, vertically oriented, passages extend upwardly from each side of the crossover passageway 40 to a respective one of the outlet ports 24,26.

During normal operation, the crossover valve 58 is in a closed position which effectively separates the crossover passageway 40 into two separated chambers. When the crossover valve is closed, fluid flow between the first inlet port 18 and the first outlet port 24 can be selectively blocked by closure of the first blocking valve 54 and in similar fashion, fluid flow between the second inlet port 20 and the second outlet port 26 can be selectively blocked by closure of the second blocking valve 56. If desired, such as for carrying out certain test or calibration procedures on a measuring instrument mounted on the manifold 10, the crossover valve 58 can be opened so that the crossover passageway 40 effectively becomes a single chamber, and by selective opening and closing of the blocking valves 54,56 fluid can be controllably directed from a selected one of the inlet ports 18,20 to both of the outlet ports 24,26.

In the preferred embodiment of the present invention, first and second vent ports 66,68 are formed in the rear surface 52 of the body 12. The vent ports 66,68 are preferably threaded to receive a threaded pipe or tubing adapter. Also, if desired for mounting of the manifold 10 to a bracket or other structure, not shown, a plurality of threaded mounting holes 70 may be conveniently provided in the rear surface 52 of the manifold body 12.

Importantly, the present invention has a means operatively disposed within the web 16 for controllably directing and selectively blocking fluid flow between the first and second primary flow passageways 36,38 and a respective one of the vent ports 66,68, and comprises first and second vent port control valves, respectively identified in the drawings by reference numbers 72 and 74 and corresponding first and second vent passages 76,78. The vent port control valves 72,74 are mounted in respective threaded seat pockets 80,82 formed in the side walls of the web section 16. As shown in the drawings, the side wall of the web section 16 is the same side wall of the manifold 10 as the side surfaces 48,50 of the body 12. Thus, each of the side walls of the web section 16, on which the vent port control valves 72,74 are mounted, is respectively disposed in coplanar relationship with a corresponding one of the first and second side surfaces 48,50 of the body 12. The first vent passage 76 has a relatively short first section, disposed in the web 16, that extends laterally between the first primary flow passageway 36 and the seat pocket 80 of the first vent port control valve 72, and a second angled section that extends between the seat pocket 80 and the first vent port 66. The second vent passage 78 is arranged in like manner between the second primary flow passageway 38 and the second vent port 68.

As shown in FIG. 7 with reference to the second vent port control valve 74, each of the vent port control valves 72,74 have a ball closure element 84 that is moveable between a closed position at which it seats against, and thereby seals, the first section of the respective vent passage 76,78, and a second position, shown in FIG. 7, at which the ball closure element 84 is spaced from the vent passage opening. Thus, it can be seen that, in response to movement of the closure element 84 to a closed position, the vent port control valves 72,74 are capable of selectively blocking fluid flow between their respective primary flow passageways 36,38 and the corresponding vent port 66,68. Alternatively, each of the vent port control valves 72,74 are capable of controllably directing a flow of fluid from their respective primary flow passageways 36,38 to the corresponding vent port 66,68 in response to movement of the closure element 84 to the open position.

Thus, it can be readily understood that, as a result of the present invention in which the vent port control valves 72,74 and at least a portion of the vent passages 80,82 are uniquely disposed in the web 16 of the manifold 10, the flange thickness of the manifold 10 can be significantly reduced. In the illustrative embodiment of the present invention described herein, the flange thickness is reduced by 40 percent. This reduction results in important savings in material and manufacturing costs without any functional compromise in the manifold's operation or use.

INDUSTRIAL APPLICABILITY

The applicable uses of the three valve manifold 10 described herein are well known, typically being used in fluid process systems in which it is desired to place a fluid property measurement instrument in direct fluid communication with two separate sampling stations, such as on both sides of an orifice. In such applications, representative pressurized fluid from each side of the orifice, i.e., the upstream and downstream sides of the orifice, are separately conducted, by way of the separate first and second primary flow passageways 36,38 to a respective designated inlet port of the measurement instrument. Typically, the respective sensed pressures and the difference, or $\Delta P$, between the sample points are used to calculate mass flow rates of the sensed fluid.

The crossover valve 58, the blocking or isolation valves 54,56, and the vent port control valves 72,74 are used during testing and calibration of the measurement instrument, in accordance with established standardized procedures, to controllably direct a selected source of pressurized fluid to a selected one, or both, of the inlet ports of the test instrument.

The three valve manifold 10 embodying the present invention has vent ports 66,68 conveniently located on the rear surface 52 of the body 12. The valves 72,74 respectively controlling the flow of fluid from the primary passageways 36,38 to the vent ports 66,68 is desirably and advantageously mounted on the side surfaces of the web section 16 of the valve.

Other aspects, features and advantages of the present invention can be obtained from a study of this disclosure with the appended claims.

What is claimed is:

1. A one-piece integrally formed manifold having a first inlet port, a first outlet port, and a fist internally disposed primary flow passageway providing fluid communication between said first inlet and outlet ports; a second inlet port, a second outlet port, and a second internally disposed primary flow passageway providing fluid communication between said second inlet and outlet ports; and an internally disposed crossover passageway providing fluid communication between said first and second primary flow passageways, said manifold consisting of:

a body portion consisting of a front surface, a first and a second side surface, a rear surface, and a bottom surface in which said first and second inlet ports are formed, and further comprising a first blocking valve mounted on said first side surface and operatively disposed in said body at a position whereat said first blocking valve is capable of controllably directing and selectively blocking fluid flow through said first primary flow passageway, a second blocking valve mounted on said second side surface and operatively disposed in said body at a position whereat said second blocking valve is capable of controllably directing and selectively blocking fluid flow through said second primary flow passageway, and a crossover valve mounted on said front surface and operatively disposed in said body at a position whereat said crossover valve is capable of controllably directing and selectively blocking fluid flow between said first and second primary flow passageways, said body further including a first and a second vent port each respectively formed in the rear surface of said body and in controllable fluid communication with a respective one of said first and second primary flow passageways;

a flange portion spaced from said body and having a mounting surface in which said first and second outlet ports are formed, said mounting surface having bolt holes arranged for receiving mounting bolts therethrough; and a web portion extending between said body and said flange and having a first and a second side wall each respectively disposed in coplanar relationship with a corresponding one of the first and second surfaces of the body, a front and rear wall parallel to the corresponding front and rear surface of the body, said front and rear wall positioned inwardly with respect to said front and rear surface of the body, a first vent port control valve mounted on said first side wall of the web and operatively disposed within said web at a position a perpendicular to a portion of the first primary flow passageway positioned within the web portion whereat said first vent port control valve is capable of selectively directing and controllably blocking fluid flow between said first primary flow passageway and said first vent port, and a second vent port control valve mounted on said second side wall and operatively disposed within said web at a position perpendicular to a portion of the second primary flow passageway positioned within the web portion whereat said second vent port control valve is capable of selectively directing and controllably blocking fluid flow between said second primary flow passageway and said second vent port.

\* \* \* \* \*